United States Patent Office 3,478,416
Patented Nov. 18, 1969

3,478,416
BONDING OF BERYLLIUM MEMBERS
Charles H. Hamilton, Cleveland, Ohio, assignor to North American Rockwell Corporation
No Drawing. Filed Feb. 15, 1967, Ser. No. 616,183
Int. Cl. B23k 31/02
U.S. Cl. 29—498                    11 Claims

ABSTRACT OF THE DISCLOSURE

A process for joining or bonding of beryllium to beryllium or other metals, such as stainless steel or titanium, wherein a thin layer of an interface material is provided between the surfaces to be bonded to facilitate diffusion. The interface material is preferably aluminum, copper, gold, silver or combinations thereof and may be plated on one or both surfaces or provided as a foil between the surfaces. The surfaces are then clamped together and heated to 1000 to 1300° F. for several hours to effect atomic diffusion and bonding of the two surfaces.

BACKGROUND

Beryllium is a low density high stiffness metal with good elevated temperature strength which makes this material particularly useful for advanced aircraft and spacecraft. Beryllium and high beryllium alloys, however, are difficult to join by conventional techniques because of the brittle nature of the welded or cast metal. Processes other than welding have been developed for joining beryllium because of this difficulty. Some such processes employ organic adhesives which are obviously limited in the temperature range of applicability. Another joining process employs simply high temperature, intimate contact between parts for a sufficient time to allow a significant amount of atomic diffusion across the interface to provide a metallurgical bond. It is found, however, that temperatures in excess of 1650° F. are required to be maintained for a substantial time in order to achieve diffusion bonding in beryllium to beryllium interfaces.

It is also desirable in many applications of beryllium to form a joint between beryllium and other materials, particularly, for example, stainless steels and titanium alloys which also have high strength at elevated temperature. Previously it has been necessary to employ mechanical interconnections between beryllium and other materials. The brittle nature of beryllium makes mechanical joints unsatisfactory in many applications.

It is, therefore, an object of this invention to provide a means for bonding beryllium.

BRIEF SUMMARY OF INVENTION

Thus, in the practice of this invention according to a preferred embodiment there is provided a method of joining beryllium members preferably to beryllium, titanium, or stainless steel which comprises providing a thin layer of a bonding metal between the mating surfaces, said bonding metal being selected from the group consisting of copper, aluminum, silver and gold. The mating surfaces are brought into intimate contact with the bonding metal therebetween and the resulting assembly is heated to a temperature in the range of from 900 to 1500° F. for a sufficient time to form a direct bond between the mating surfaces. It is particularly preferred that the mating surfaces are beryllium and beryllium or titanium and the bonding metal be selected from the class consisting of aluminum, copper and silver.

DESCRIPTION

By the use of this invention beryllium members may be readily joined to beryllium or other metals with bonds which approach the strength of the parent beryllium. This bond is achieved at moderate temperatures which are preferably below 1300° F. By bonding in a temperature region below 1300° F. no difficulties are encountered in either beryllium or titanium due to grain growth or re-crystallization which could lead to decreased ductility of these materials. It should be recognized that when beryllium or titanium are used in the specification, the terms include alloys high in beryllium or titanium as well as the pure metals. Both beryllium and titanium and the common alloys that are high in beryllium or titanium have basically a hexagonal close packed crystal structure. The bonding metals are selected from the class consisting of copper, aluminum, silver and gold all of which are face centered cubic materials which form eutectic alloys with beryllium. These metals have relatively low mutual solubility with beryllium, and aluminum does not form any intermetallic compounds with beryllium. Although copper, silver, and gold form intermetallic compounds with beryllium in an equilibrium situation, the relatively low temperature treatment herein involved does not produce any measurable quantity thereof and there is no interference with mechanical properties of the bond. The bonding metal in the interface between the surfaces to be joined may facilitate bonding by one or more of several mechanisms including: increased surface and volume diffusion rates; protection of the parent metal from surface contamination by oxidation and adsorption; formation of a liquid eutectic alloy between the solid parent metal and solid bonding metal at the bonding temperature; and solution of surface contamination by the bonding metal or resultant eutectic liquid.

In the practice of this invention according to a preferred embodiment, a very thin layer of at least one of the bonding metals is applied in the interface between the mating parts of the members to be joined. This interface or bonding metal can be applied as a plating to one or both of the mating surfaces, preferably only one thereof, or the bonding metal can be inserted as a thin foil between the mating surfaces. It is preferred that the thickness of the bonding metal be in the range of from 10 to 5000 micro-inches. While thicker films of bonding metal may be operably employed it is found that the strongest joints are obtained with thinner films.

The surfaces of beryllium to be bonded should be ground or lapped as smooth as practical, and further chemical cleaning of the surfaces is preferred immediately before bonding. One such suitable cleaning comprises a cathodic cleaning in potassium hydroxide solution using a concentration of 3 oz./gal. A current density of about one ampere per square inch is maintained for three to five minutes at room temperature. After rinsing, the beryllium members are pickled in an acid bath for about 30 seconds at 140° F. A somewhat longer time, or repetition, may be employed if uniform appearance of the surface is not obtained. A preferred acid bath comprises an aqueous solution of 92 fluid oz./gal. of phosphoric acid, six fluid oz./gal. of sulfuric acid, and 15 oz./gal. of chromic acid ($H_2CrO_4$). After rinsing, a zincate treatment is applied to the beryllium surfaces which apparently deposits about five microinches of zinc to serve as a base or strike for subsequent layers. A preferred zincate bath comprises 92 oz./gal. of zinc sulfate and 4.5 fluid oz./gal. of 48% hydrofluoric acid. The beryllium members are immersed in the zincate bath for about 30 seconds at 75° F. Other cleaning methods or surface activation treatments will be apparent to one skilled in the art. Thus, for example, displacement films of zinc can also be applied successfully.

Directly following the cleaning operation from 10 to 5000 microinches of aluminum, copper, gold or silver may be plated directly on the beryllium surface. It has been found that a suitable coating technique for applying copper comprises an electro-plating bath comprising an aqueous solution of 45 grams per liter sodium cyanide, 20 grams per liter copper cyanide, 15 grams per liter potassium carbonate, 7.5 grams per liter potassium hydroxide and 22.5 grams per liter sodium fluoride. The pH of the bath is preferably maintained at about 13.2 and the temperature at 130° F. A current density of 30 amperes per square foot is employed for about one minute followed by a current density of 15 amperes per square foot thereafter until the desired plating thickness is obtained.

Copper can also be plated directly on activated beryllium without the above described zincate treatment. For such an activation treatment the beryllium may be anodically pickled for about one minute at 15 amperes per square foot in an aqueous bath comprising about 10% by volume of 85% phosphoric acid and 20% by volume of 38% hydrochloric acid. An additional two minutes of chemical pickling in concentrated nitric acid is then employed without rinsing between the two steps. After a water rinse, the beryllium members are acid dipped for about one minute in an aqueous solution comprising 100 grams per liter of ammonium sulfate and 10 grams per liter of sulfuric acid. All three of these baths are maintained at about 80° F. After thus activating the surface, electroplating can be applied after a water rinse. A suitable copper bath for plating on activated beryllium comprises 30 grams per liter of sodium cyanide, 22.5 grams per liter of copper cyanide, 15 grams per liter of sodium carbonate and 0.5 gram per liter of sodium sulfite. The pH of the bath is preferably maintained at about 9.0 and the temperature is maintained at 120° F. A current density of 25 amperes per square foot is employed until a desired plating thickness is obtained.

Silver can be electroplated directly on an activated beryllium surface in the same manner as copper or may be plated on beryllium after a zincate treatment. A suitable silver plating bath comprises 75 grams per liter silver cyanide, 112 grams per liter of potassium cyanide and 22.5 grams per liter of potassium carbonate. The pH of the bath is maintained at about 13 with suitable additions of potassium hydroxide and the temperature is maintained at 120° F. A current density of 25 amperes per square foot is maintained until the desired plating thickness is obtained.

Similarly gold can be readily electroplated on the activated beryllium surface or on the zincate treated surface from conventional gold plating baths. Aluminum can be plated directly on the activated beryllium from conventional nonaqueous organic electrolytes. It will also be apparent to one skilled in the art that copper, gold, silver and aluminum can alternatively be applied to the beryllium surface after cleaning as outlined above by vacuum metallizing, sputtering, vapor deposition, or the like. It is found in vacuum metallizing aluminum onto beryllium that a cleaning process comprising up to 20 seconds immersion in 20% sulfuric acid will suffice. The bonding metal may also be provided as thin foil provided all the bonding contact surfaces are chemically cleaned just prior to diffusion bonding, including cleaning of the foil surfaces. When foils are employed, cleaning should be conducted immediately before bonding and when platings are employed, bonding should be conducted as soon after cleaning and plating as possible.

In addition to single layers of gold, silver, copper or aluminum, combinations thereof can be advantageously employed. By combining bonding materials, low temperature bonding is enhanced. The combined materials can comprise alloy foils or alloys deposited from plating baths, or, if plating is employed, may advantageously comprise successive or alternate layers of the individual materials. A preferred combination for bonding beryllium comprises aluminum and silver, preferably in the proportions of about the lowest melting temperature alloy.

After cleaning the mating surfaces and applying a bonding metal either in the form of a plate on one or more of the surfaces or as a foil between the mating surfaces the parts are clamped or otherwise contacted together so that a substantial pressure is applied across the bonding interface. Extremely large pressures are not required for the bonding since atomic diffusion occurs due to intimate contact of the cleaned surfaces, and only sufficient pressure is required to maintain intimate contact. It is preferred that heating for bonding be conducted in vacuum or dry inert gas to prevent contamination of the bond and parent metals with oxides and other deleterious materials. The application of pressure to assure intimate contact may be before or after the parts reach temperature.

The temperature at which bond formation is conducted is preferably in the range of from 900 to 1500° F. It is particularly preferred that the bonding be conducted in a temperature range of 1000 to 1300° F. At temperatures below 1000° F. the diffusion time may be unduly long and at temperatures above 1300° F. some tendency towards crystallographic changes may occur, particularly in alloys of beryllium or titanium. The temperature of the parts to be joined is preferably maintained for about one to eight hours in the range of from 1000 to 1300° F. The rates of heating and cooling of the members are not critical.

Diffusion bonding of beryllium with gold or aluminum in the temperature range of about 1200° F. is apparently eutectic bonding since the beryllium-aluminum and beryllium-gold alloys formed in this temperature range each have a eutectic reaction with a melting temperature below that of either metal, namely at about 1076° F. for gold and 1193° F. for aluminum. Bonding above 1220° F. with aluminum clearly involves formation of a liquid within the interface and may be termed brazing. Good bonds are obtained with aluminum, however, below the eutectic temperature by solid state diffusion. Bonding of beryllium with silver or copper at a temperature of about 1200° F. is purely solid state diffusion since no eutectic reactions occur below this temperature region, the eutectics in these systems being at 1618 and 1589° F. respectively. Thus, without the appearance of liquid phase in the interface, satisfactory bonds are obtained with silver or copper as the bonding metal by means of solid state diffusion.

It is particularly preferred that bonding of beryllium to beryllium be conducted with aluminum as the bonding metal. Good bond strengths are obtained over a wide range of bonding temperatures probably due to formation of a beryllium-aluminum eutectic or at least some solution of beryllium in the aluminum. The bonding procedure is not difficult and is readily accomplished at reasonable times and temperatures. The chemical cleaning of the beryllium surface is readily accomplished when bonding with aluminum by merely immersing the beryllium for about two to 20 seconds in room temperature 20% sulfuric acid.

In the bonding of beryllium to titanium, the beryllium surfaces are cleaned and prepared in substantially the same manner as hereinabove described. The titanium surfaces to be bonded should also be ground or lapped as smooth as practical and carefully mated to the beryllium surfaces. The titanium should also be mechanically cleaned with a conventional acid pickle such as, for example, an aqueous solution of 2% hydrofluoric acid and 10% nitric acid. It is preferred in bonding titanium and beryllium to employ a bonding metal selected from the class consisting of the face centered cubic metals copper, aluminum, silver, and gold. It is particularly preferred to employ aluminum as the bonding metal between beryllium and titanium. The bonding of beryllium to titanium is conducted in the identical manner set forth hereinabove for bonding beryllium to beryllium. The bonding temperature is particularly preferred to be in the range of from 1000 to 1300° F. for a period of from one to eight hours at temperature. The heating and cooling rates are not critical.

In the bonding of beryllium to stainless steel the beryllium surfaces are cleaned and prepared in substantially the same manner as set forth hereinabove. The beryllium can, for example, comprise sheet material bonded to a stainless steel honeycomb core. In this case the bonding metal may be plated on the beryllium or provided as a foil between the honeycomb core and the beryllium sheets so that an excess of plating is not unnecessarily spread throughout the honeycomb. The bonding metal is preferably selected from the class consisting of aluminum, copper, silver, and gold.

The surface of the stainless steel is preferably cleaned and activated before bonding by immersion in a conventional alkaline cleaner followed by cathodic treatment for two to four minutes at three to six volts in a room temperature solution of 25 to 50% hydrochloric acid (20° Baumé).

A slightly different technique may be employed for bonding to stainless steel or other steel surfaces wherein the bonding material, preferably copper, is plated on the steel. After plating, a preliminary diffusion treatment is conducted with the stainless steel alone, comprising heating for from 2 to 8 hours at about 1700° F. in hydrogen or vacuum. The bonding to beryllium follows and the joint strengths are enhanced thereby since a better bond is obtained between the steel and the bonding metal.

In either case, the bonding of beryllium and stainless steel is conducted in the identical manner set forth hereinabove for bonding beryllium to beryllium. Bonding pressure can be applied by means of a press or in an autoclave as will be apparent to one skilled in the art. The bonding temperature is particularly preferred to be in the range of from 1000 to 1300° F. for a period of from 1 to 8 hours at temperature. Heating and cooling rates are not critical.

The following examples are offered to illustrate the invention in greater detail.

Examples

Cross rolled beryllium sheet 0.020 inch thick was cut to ½ inch by two inch coupons by electrical discharge machining to minimize the introduction of edge cracks. Similarly ½ inch by two inch coupons of the 6% aluminum, 4% vanadium-titanium alloy were sheared from 0.020 inch thick sheet. The titanium alloy was in the solution annealed condition and the beryllium in the as-rolled condition.

The titanium alloy coupons were chemically cleaned prior to bonding by immersion in a room temperature solution of 2% hydrofluoric acid, 10% nitric acid and 88% tap water by volume for ten minutes. The coupons were then rinsed with tap water followed by a methyl alcohol rinse. The beryllium coupons that were bonded with metal foil were pre-bond cleaned by immersion in 20% sulfuric acid, 80% tap water solution for two to five seconds followed by a rinse with tap water, and followed by rinse with methyl alcohol.

The beryllium coupons that were electroplated were first cathodically cleaned for about four minutes in a room temperature solution of three oz./gal. potassium hydroxide at a current density of one ampere per square inch. After rinsing they were pickled for about 30 seconds at 140° F. in a solution comprising 92 fluid oz./gal. $H_3PO_4$, 6 fluid oz./gal. $H_2SO_4$ and 15 oz./gal. $H_2CrO_4$. After cleaning and pickling a zincate treatment was applied for 30 seconds at 75° F. in a solution comprising 92 oz./gal of zinc sulfate and 4.5 fluid oz./gal. of 48% hydrofluoric acid. Following this treatment at least duplicate coupons were electroplated with approximately 150 micro-inches of copper or silver.

Aluminum foil was used for bonding beryllium to beryllium and beryllium to titanium. The beryllium and titanium were cleaned as set forth hereinabove and the foil was precleaned by immersing in a 10% sodium hydroxide solution for five minutes followed by a water rinse and then a methyl alcohol rinse. Two foil gauges were employed, namely 500 and 1000 micro-inches.

Lap joints were made by overlapping one coupon over the second for an overlapping distance of from ¼ to ½ inch with the bonding metal between the mating surfaces. The mating surfaces were held in close contact under pressure by means of a bonding clamp which comprised flat steel plates bolted together with one bolt on each side of the bonded joint. The bolts were tightened under a torque load of 150 inch-pounds to provide a pressure on the lap joint.

The diffusion bond coupons were then heated in an inert gas retort heated by a radiant heating furnace and temperature was monitored during the bonding by a thermocouple inserted in the clamping blocks. The retort was evacuated and back filled with argon three times before the retort was inserted in the furnace. The argon was dried and passed through a column of titanium chips heated to 1500° F. for the removal of impurities. A continuous gas flow of two cubic feet per hour was passed through the retort during the bonding cycle. The time of bonding was three hours with the exception of one beryllium to beryllium bond employing silver as the bonding metal, in which case the time was three and one-half hours. Approximately one hour was required to reach temperature and two hours to cool from the bonding temperature to room temperature.

The bonded coupons was tested to failure by loading in tension. This loading applied primarily a shear stress across the bond interface; however, a superimposed bending force was also present at the interface since no doublers were used on the ends of the coupons and the loading was, therefore, slightly eccentric. Table I sets forth the bonding parameters and resultant joint strengths obtained in beryllium and titanium coupons bonded as hereinabove described.

TABLE I

| Metal bonded (to Be) | Bonding metal | Bonding metal thickness (micro-inches) | Bonding temperature (° F.) | Bonding time (hrs.) | Bond shear stress (p.s.i.) |
|---|---|---|---|---|---|
| Be | Cu plate | 150 | 1,250 | 3 | Over 738 |
| Be | do | 150 | 1,200 | 3 | Over 1,255 |
| Be | Ag plate | 150 | 1,250 | 3½ | Over 3,080 |
| Be | do | 150 | 1,200 | 3 | Over 555 |
| Be | Al foil | 1,000 | 1,250 | 3 | Over 1,640 |
| Be | do | 500 | 1,190 | 3 | Over 5,680 |
| Be | do | 500 | 1,050 | 3 | Over 4,750 |
| Ti | do | 1,000 | 1,200 | 3 | Over 3,560 |
| Ti | do | 1,000 | 1,250 | 3 | Over 2,000 |
| Ti | do | 1,000 | 1,250 | 3 | Over 4,000 |
| Ti | do | 500 | 1,190 | 3 | Over 4,410 |
| Ti | do | 500 | 1,200 | 3 | Over 2,230 |

In each instance the failure of the bonded couple as set forth in Table I occurred in the parent beryllium metal rather than the joint or the titanium alloy and the ultimate strength of the bond is invariably higher than the value set forth in Table I. It is apparent that substantial bond strengths are obtained in beryllium and beryllium-titanium bonds employing face center cubic metals for the bonding metal.

The foregoing examples are merely illustrative of the practice of this invention and many variations thereof will be apparent to one skilled in the art. It is to be understood that the invention may be practiced otherwise than as specifically described, limited only as is indicated in the appended claims.

What is claimed is:

1. A method of diffusion bonding beryllium comprising:
providing a layer of less than 5000 micro-inches thickness of a bonding metal selected from the group consisting of silver, copper, gold and aluminum between mating surfaces, one of the mating surfaces being beryllium and the other of the mating surfaces being selected from the group consisting of beryllium, steel and titanium;
bringing the mating surfaces together;
and while maintaining the mating surfaces in intimate contact heating the resulting assembly at a temperature below the melting point of the bonding metal and below a temperature causing significant embrittlement of beryllium in the range of from 1000 to 1300° F.; and
maintaining the temperature for a sufficient time to form a direct bond between the mating surfaces including diffusion of bonding metal away from the interface into the mating surfaces.

2. A method as defined in claim 1 wherein the temperature is maintained for a period in the range of from one to eight hours.

3. A method as defined in claim 1 wherein said layer is provided by electrolytic deposition on at least one of said mating surfaces.

4. A method as defined in claim 1 wherein said layer is provided as a thin foil between said mating surfaces.

5. A method as defined in claim 1 wherein said bonding metal is selected from the group consisting of aluminum, copper and silver; and the other of said mating surfaces is selected from the group consisting of beryllium and titanium.

6. A method of bonding beryllium comprising:
providing a layer of less than 5000 micro-inches thickness of aluminum between mating surfaces, one of the mating surfaces being beryllium, and the other of the mating surfaces being selected from the group consisting of beryllium, steel, and titanium;
contacting the mating surfaces, and while maintaining the mating surfaces in intimate contact, heating the resulting assembly at a temperature below a temperature causing significant embrittlement of beryllium in the range of from 1000 to 1300° F.; and
maintaining the temperature for a sufficient time to form a direct bond between the mating surfaces including diffusion of aluminum away from the interface into the mating surfaces.

7. A method as defined in claim 6 wherein said aluminum is provided as a foil between said mating surfaces.

8. A method as defined in claim 6 wherein both of said mating surfaces are beryllium.

9. A method as defined in claim 6 wherein one of said mating surfaces is beryllium and the other of said mating surfaces is titanium.

10. A method as defined in claim 9 wherein said titanium comprises an alloy of substantially six percent aluminum, four percent vanadium and 90 percent titanium.

11. A method as defined in claim 6 wherein the temperature is maintained for a period of from one to eight hours.

References Cited

UNITED STATES PATENTS

| | | | |
|---|---|---|---|
| 2,770,033 | 11/1956 | Zarith | 29—502 X |
| 3,083,451 | 4/1963 | Atkinson | 29—501 X |
| 3,090,117 | 5/1963 | Hanks et al. | 29—502 X |
| 3,105,294 | 10/1963 | Atkinson | 29—502 X |

OTHER REFERENCES

The Metal Beryllium; White, D. H. and Burke, J. E.; Asm; 1955; pp. 290–295.

JOHN F. CAMPBELL, Primary Examiner

J. L. CLINE, Assistant Examiner

U.S. Cl. X.R.

29—501, 502, 504